United States Patent Office 3,028,295
Patented Apr. 3, 1962

3,028,295
METHOD AND APPARATUS FOR REMOVING OBNOXIOUS ODORS FROM GASES
Karl Gustav Trobeck, Roslags-Nasby, Sweden, and Adalberto Tirado and Walter Lenz, Tlalpam, D. F., Mexico, assignors to Aktiebolaget B. T. Metoder, Stockholm, Sweden, a corporation, and Fabricas de Papel Loreto y Pena Pobre, S.A., Mexico City, Mexico, a corporation of Mexico
Filed June 11, 1958, Ser. No. 741,350
9 Claims. (Cl. 162—51)

This invention relates to a method and apparatus for the destruction or removal of obnoxious odor from gases, especially gases carrying mercaptans or other sulfur bearing compounds such as result from paper pulp making and petroleum refining, and is herein illustrated as embodied in process and apparatus for making paper pulp.

Such obnoxious gases from the relief and blow-down in pulp making have in some mills hitherto been treated by leading them through black liquor in connection with air for oxidizing the black liquor. That process does not, however, destroy the obnoxious odor of the condensate resulting from the relief and the blow-down in the pulp making process. It is known that only about 70% to 80% of the mercaptans from the gases are destroyed by that treatment.

It is therefore among the objects of the present invention to destroy the remainder of the obnoxious material, and render the mill, as a whole, odorless. Usually only the odor produced from the cooking process needs to be destroyed, but any obnoxious product of the recovery boiler may be separately treated, if need be, to render the whole mill odorless.

Thus the process sometimes needs separate treatment of the relief and the blow-off, on the one hand, and the recovery boiler gases, on the other hand, to render the mill odorless.

When this procedure is followed, the obnoxious gases and condensates are led to a heated scrubber with added air. The exit gases from the scrubber are led to a chlorination tower. The odor is largely destroyed in the scrubber, probably by conversion of the mercaptans into alcohols and sulfides. These sulfides probably are further oxidized by the air present. These reactions can be promoted, if desired, by a catalyst, for instance, iron oxide, such as is used for gas purification.

It is important to have good contact between the obnoxious gases, the air and the condensate.

Where intermittently operated, a blow of the gases produces a large volume of gas which may overload the devices. It is, therefore, advisable to provide a gas accumulator near where back pressure of gases builds up at the entrance to the scrubber to hold gases temporarily and release the accumulated gas when the pressure has dropped.

It is preferable to put the gases into the scrubber through a tangential inlet, parallel to the rotation of the discs in the scrubber. The added air may come in through a tangential inlet, either separately or through the same inlet.

The air may be replaced by a gas carrying a higher content of oxygen.

The condensate leaving the scrubber may be used for washing as hot water, thus eliminating loss of heat in the mill (as shown in FIGURE 2).

It is also possible to eliminate the chlorine described by substituting other oxidizing agents such as hydrogen peroxide, etc.

In order to destroy completely the odor, it is preferable to keep a small excess of free chlorine at the outlet from the chlorinator. This excess chlorine may be eliminated by scrubbing the gases with water or adding a small amount of either ammonia gas or a caustic solution.

Other features and advantages will hereinafter appear, or will be apparent to those skilled in the art, from the following specification taken in conjunction with the accompanying drawings.

Figure 1:
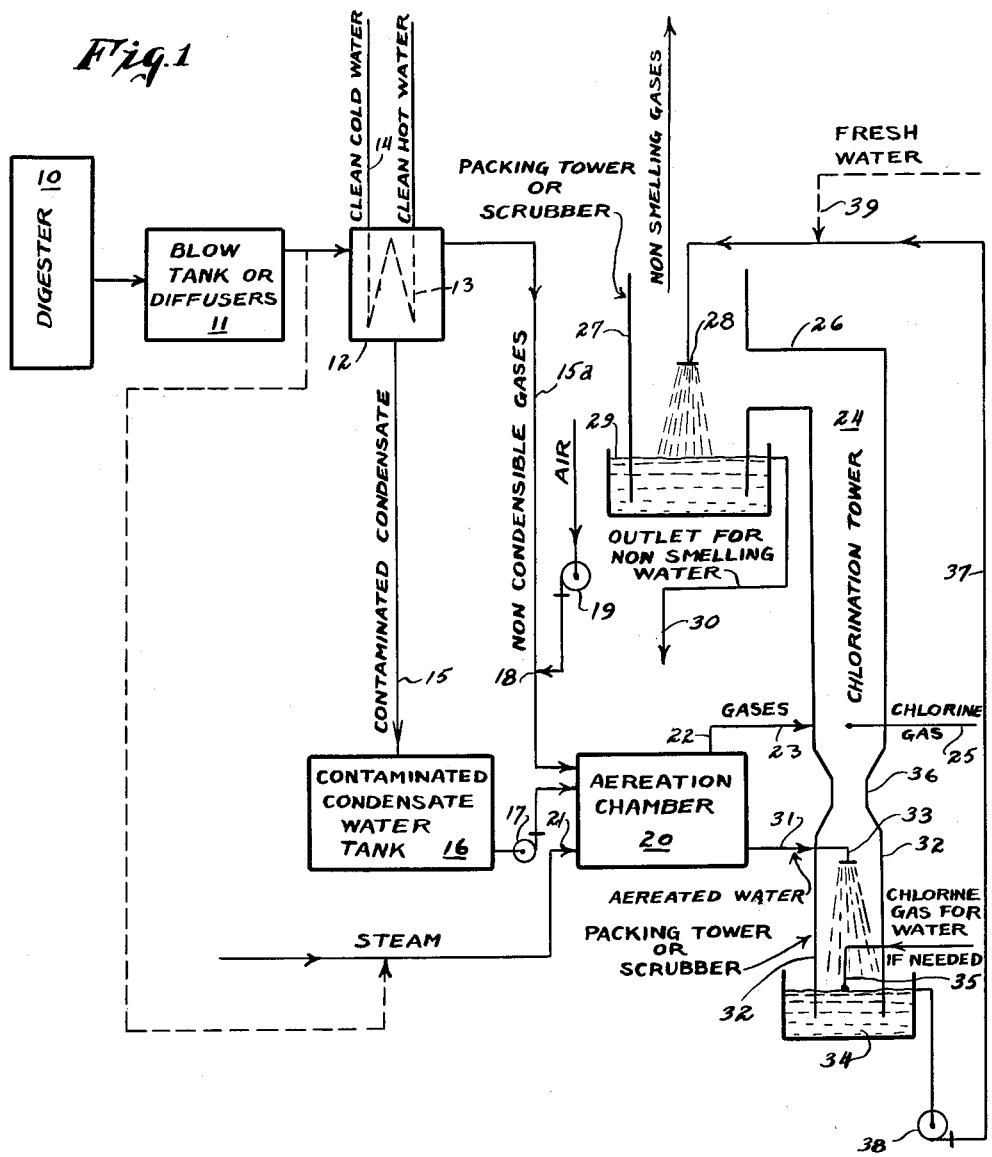
FIG. 1 shows a detail outline flow sheet of treatment of gases from the digester.

In the form illustrated for pulp mills, but also usable for deodorization in the oil industry, the gases are shown, FIG. 1, coming from a digester 10 to gas relief and blow-off tank 11, and then to a heat recovery chamber of any conventional type 12, or in some other conventional manner.

The contaminated condensate water obtained here passes through a draw-off pipe 15 to a storage tank 16.

The non-condensable gases coming from the heat recovery chamber 12 pass off through a pipe 15a into which air is admitted at 18 by an air blower or pump 19, and the air and treated gases enter the aeration chamber 20 to which steam can be added at 21 to obtain the desired reaction temperature. The steam can preferably be taken from the steam line between the blow tank 11 and the heat recovery chamber 12.

By means of pump 17 the contaminated water in tank 16 is introduced into the aeration chamber 20 where the sulfur compounds carried in the non-condensable gases and in the contaminated water are converted into less odorous substances in a single operation. Thus no fresh water is needed to treat the obnoxious gases coming from the digester.

From the aeration chamber 20 gases carrying some residual odor pass off at the top at 22 and are conducted by a pipe 23 into a chlorination tower 24 near an inlet 25 admitting chlorine gas to the tower.

In the embodiment illustrated the tower is shown as empty, but, if desired, it may be packed, as with broken brick to ensure contact of flowing gases. The tower delivers the gases through a horizontal outlet 26 to a final scrubbing tower 27 open at both ends, so that gases escape at the open top, flowing through a water spray coming from an overhead sprayer 28. The condensed material carried down by the spray falls into a partly filled tank 29 from which odorless water is carried off by an overflow 30.

The water for the sprayer 28 may be satisfactorily drawn from the aereated condensed water of the chamber 20 by connecting the drawing-off pipe 31 directly to the suction of the pump 38.

If that water in pipe 31 needs deodorizing it may fall through a scrubber or loosely packed tower 32, being delivered by a sprayer 33 so as to fall into a bottom tank 34.

While falling it may be chlorinated as by chlorine gas delivered into the tower 32 by an inlet 35.

The tower 32 is preferably connected below the bottom of the tower 24 through a constricted section 36.

The bottom tank 34 has been found a satisfactory source of water for the spray 28 and may deliver the water through a pipe 37 being driven through the pipe 37 by a pump 38. Fresh water may be added at 39 to the water flowing in the pipe 37.

The temperature of the aerator chamber 20 is preferably 30° C. to 95° C., and is more efficient at the higher temperature. In chlorination tower 24, chlorine was added continuously at about 0.5 to 2 kilograms per ton of pulp, with an additional 0.1 to 0.3 kilogram per ton to eliminate the odor of the blow-off from the digesters, which is added in batches if the blow-off is in batches.

In chlorination tower 24 the temperature should usually be between 30° C. and 70° C. to avoid attacking the tower material.

The heavy stream of white fumes produced at the chlorination tower carries no odor, or at times a faint sweet odor disappearing within a distance of 60 to 100 feet.

Figure 2:
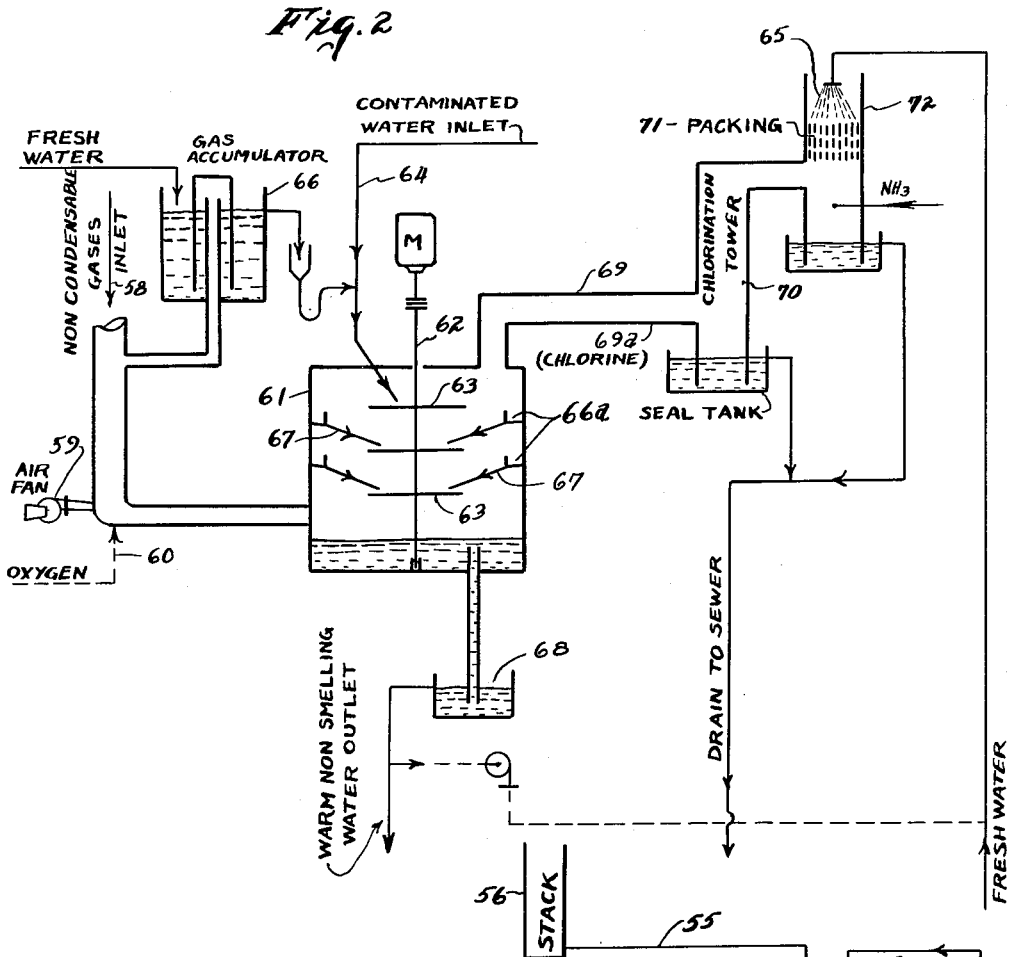
FIG. 2 shows diagrammatically one alternative form of an aerating device and its connections, on a larger scale.

FIG. 2 shows in detail an aerating device that has been found highly efficient for treating the gases and contaminated water in a single operation.

The modified aerating device shown in FIG. 2 with modified connections may include an inlet 58 for material to be treated, an air fan 59, an inlet 60 for oxygen, a casing 61, a shaft 62 shown as operated by a motor above the casing and carrying discs 63 rotating with it preferably at a peripheral speed of at least twenty meters a second. A condensate supply 64 delivers condensate on the rotating discs so that the condensate is scattered through the chamber formed by the casing 61.

The condensate thrown by the top disc 63 against the inner face of the casing 61 flows down into an annular trough 66a lying against that face and delivers the condensate to the next disc 63 through radial pipes 67. That disc throws the condensate again against the face whence a second trough delivers it to a third disc. It should be understood that the number of discs may be increased for greater efficiency.

The effluent water in this form of device passes off through a level maintaining tank 68 and may be carried through to a final spray 65 for washing the escaping gases.

These gases come from the scrubber 61 through a flue 69 into which chlorine is introduced at 69a and are then led to a chlorinating tower 70 and thence to the tower 72 containing packing 71 where ammonia may be added and any surplus water is drained from the bottom thereof to the sewer.

Figure 3:
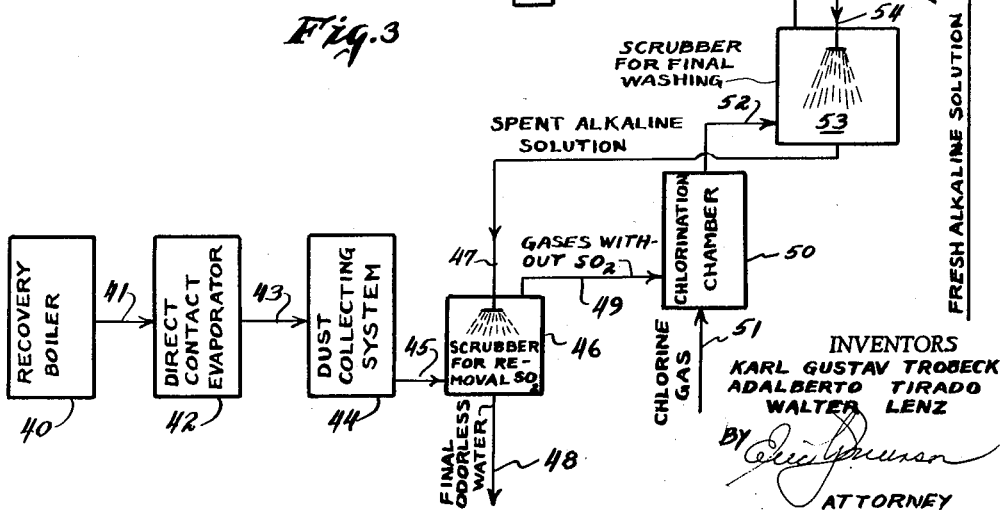
FIG. 3 shows a detail outline flow sheet of gases from the recovery boiler.

Some details of the treatment of gases from the recovery boiler 40 are diagrammatically shown in FIG. 3. There the gases are shown as conducted from the boiler 40 by a pipe 41 to a direct contact evaporator 42 and thence by a pipe 43 to a dust collector system 44.

The gases, dust free, then pass by a pipe 45 to a scrubber 46 shown as supplied with spent or dilute alkaline solution by an overhead spray 47, from an alkali treatment described below.

If properly constructed the direct contact evaporator 42 should wash out the $SO_2$ and the scrubber 46 may be eliminated.

Final odorless discarded water flows from the scrubber 46 through a bottom pipe 48 while gases free from $SO_2$ escape through a top pipe 49 to a chlorination chamber 50.

A small amount of air is needed to promote the reaction between the mercaptans and the water before the gases are introduced into the chlorination chamber 50. Normally, this air enters through small leaks in the apparatus and/or ducts numbered 42 to 49 inclusive, or if needed additional air may be introduced separately.

Chlorine gas enters the chamber 50 through a pipe 51 and chlorinated gas is led from the top by a pipe 52 into a final wash chamber 53 where it is sprayed by fresh alkali solution through a spray pipe 54. If desired, another oxidizing agent, such as sodium hypochlorite may be added instead of the chlorine.

Absolutely odorless gases escape from the wash chamber 53 through a pipe 55 which delivers the gases to a chimney 56 discharging to the atmosphere.

Ordinarily the gases coming from the recovery boiler, if the black liquor is first properly oxidized, are odorless and the scrubber 46 and chlorination at 50 may not be needed. If chlorination seems needed here, it was found that 0.25 kilogram of gaseous chlorine per ton of pulp was adequate. A total alkali requirement was 1 to 3 kilograms NaOH per ton of pulp was all that was needed, or the equivalent $Na_2CO_3$.

A temperature of 50° C. to 80° C. within the chlorination chamber 50 was adequate and the pH of the final washing water between 6 and 9. Since hypochlorous acid is a very efficient agent to destroy odorous sulphur compounds, the lower the pH the better the result.

The following table shows the concentration in percent per millions of volume of sulphur compounds in gases from different sources during the pulp production, as well as in some other gases for the purpose of comparisons, as determined by means of a titrilog reading. The titrilog is a chemical-electronic instrument which continuously records concentration of oxidizable sulphur compounds. The measurement is accomplished by a titration with bromine. The bromine is electrolytically generated in a solution in which the sulphur compounds are absorbed, a feed back amplifying system controls the bromine generating current so that the net rate of bromine generation is at all times equivalent to the rate of absorption of the sulphur compounds. A recording milliameter records the generating current. The net current is proportional to the sulphur compound concentration in the sample (see Industrial Engineering Chem., vol. 46, page 1422, July 1954).

| Sources | Titrilog Net Reading | Sulfur compounds given as $H_2S$, p.p.m. |
|---|---|---|
| Liquor Tank (All measurements obtained by taking samples at a point 6" inside vent pipe): | | |
| Vent of Weak Black Liquor Tank from Washers | 40–55 | 2.44–3.55 |
| Same before oxidation | 18–22 | 1.09–1.34 |
| Same after oxidation | 11 | 0.67 |
| Vent from cyclone of oxidizing tower | 17–23 | 1.04–1.40 |
| Sealed tank of barometric column Multiple Effect Evaporation | 3 | 0.18 |
| Condensate water from Multiple Effect Evaporator | 2 | 0.12 |
| Chimney of smelt-dissolving tank | 7 | 0.43 |
| Vent of white liquor tank | 11–15 | 0.67–0.92 |
| Concentrated black liquor tank | 22–28 | 1.34–1.70 |
| Water and Gases From Digesters Untreated: | | |
| Relief gases after dilution with 900 cubic feet of air per minute | Variable from 30 to 300 | from 1.8 to 18.3 |
| Gases from chlorination outlet within fume stream | 3–6 | 0.18–0.36 |
| Gases From Recovery Boiler (The black liquor was previously oxidized, with an oxidation of 100%, measured as conversion of sulfides into thiosulfates): | | |
| Before scrubbing and chlorination | 10–26 | 0.61–1.58 |
| After scrubbing and chlorination, Final wash at pH of 6 | 8–20 | 0.49–1.22 |
| Same. Final wash at pH of 9 | 3–4 | 0.18–0.24 |
| For Comparison: | | |
| Gases from power boilers, burning fuel oil | 2–3 | 0.12–0.18 |
| Cigarette smoke. Cigarette 2 inches from intake of sampling apparatus | 90 | 5–49 |

It should be understood that the foregoing description is given by way of example and not by way of limitation. The invention may find a variety of expressions and applications within the scope of the following claims.

What is claimed is:

1. The process of removing obnoxious odors from gases resulting from sulphate and soda pulp manufacture, which comprises in cooling these gases so that substantially all water vapor contained in these gases condenses and separates from the non-condensable gases, mixing the liquid condensate thus produced with the non-condensable gases and with an oxygen containing gas, whereby the larger portion of the obnoxious odors is eliminated, separating the non-condensable gases from the mixture and oxidizing the separated non-condensable gases with an oxidizing agent capable of oxidizing the remaining odoriferous substances in the gas prior to releasing the gases to the atmosphere.

2. A process according to claim 1 wherein the oxidizing agent capable of oxidizing the remaining odoriferous substances is chlorine.

3. A process as recited in claim 2 wherein the non-condensable gases after treatment with chlorine and prior to releasing the same to the atmosphere are washed with water.

4. A process as recited in claim 3 wherein the water used for the washing of the non-condensable gases is the water present in the liquid condensate resulting from the first mentioned oxidation step wherein the non-condensable gases are treated with the oxygen containing gas.

5. A process as recited in claim 4 wherein said liquid condensate is treated with chlorine prior to utilizing the same for washing said non-condensable gases.

6. The process of removing obnoxious odors from gases resulting from sulphate and soda pulp manufacture which consists in cooling these gases so that substantially all water vapor contained in these gases condenses and separates from the non-condensable gases, conveying the liquid condensate to a mixing chamber maintained at a temperature of 30–95° C. and introducing the liquid condensate into the chamber in the form of a fine spray, introducing a small amount of fresh water into the chamber, separately introducing the non-condensable gases and air into said aeration chamber and mixing them with said condensate and said fresh water, whereby the larger portion of obnoxious odors is eliminated, separating the non-condensable gases from the mixture and oxidizing the separated non-condensable gases with an oxidizing agent capable of oxidizing the remaining odoriferous substances prior to releasing said gases to the atmosphere.

7. An apparatus for removing obnoxious odors from gases coming from sulphate and soda pulp plants comprising: a cooling chamber for condensing and separating water vapor from gases coming from the plant, an aeration chamber, means for separately conveying the liquid condensate and the non-condensable gases from said cooling chamber to said aeration chamber, means for introducing air into the non-condensable gases being conveyed to the aeration chamber, means for introducing steam into said aeration chamber, means in the aeration chamber for mixing the liquid condensate non-condensable gases, air and steam, means for separately removing the non-condensable gases and the liquid from said aeration chamber, a flue and means for introducing the non-condensable gases from the aeration chamber and an oxidizing agent into said flue to oxidize any odoriferous substances present in said non-condensable gases.

8. An apparatus for eliminating obnoxious odors from gases coming from sulphate and soda pulp plants comprising: a cooling chamber for condensing and separating water vapor from gases coming from the plant, an aeration chamber, means for separately conveying from said cooling chamber to said aeration chamber the water condensed and the gases and vapors not condensed, means for adding air to the gases and vapors not condensed, a device in said aeration chamber for mixing the condensed water with the mixture of air and gases and vapors not condensed in the cooling chamber, means for introducing steam into said aeration chamber, a chlorination tower in which the liquid as well as the gases and vapors leaving the aeration chamber are mixed with chlorine before escaping from the plant, means for conveying the liquid from the bottom of the aeration chamber and spraying it in chlorine containing gas in the lower part of the chlorination tower, and means for conveying the gases and vapors from the aeration chamber to the chlorination tower in a zone above the one in which the liquid from the aeration chamber is treated.

9. An apparatus, according to claim 8, having means for washing the gases and vapors leaving the chlorination tower with water before escaping from the plant.

References Cited in the file of this patent

UNITED STATES PATENTS 1,854,428    Segerfelt _____ Apr. 19, 1932

FOREIGN PATENTS 1,142,526    France _____ Apr. 1, 1957

OTHER REFERENCES

Enderlein: Sulphate Mill Odors, from Paper, pages 9 and 10, vol. XXIX, No. 12, Nov. 23, 1921.

Gordon: Chlorine as a Deodorant in Sulphate Paper Pulp Manufacture, from TAPPI Sec., pp. 253–257, Apr. 28, 1938.

Haegglund: The Odor Question in Sulphate Pulp Manufacture, from Paper Trade Journal, page 50, Dec. 16, 1926.

Meuly: Abatement of Sulphate Pulp Mill Malodors by Odor Masking Agents, from TAPPI, page 154, vol. 36, No. 4, Apr. 1, 1953.

Gordon: Elimination of Obnoxious Gases in the Sulfate Pulping Process, pp. 565–567, Ind. and Eng. Chem., vol. 26, No. 5, May 1934.